(12) United States Patent
Liebl et al.

(10) Patent No.: US 12,312,757 B2
(45) Date of Patent: May 27, 2025

(54) SWEEPER IMPLEMENT

(71) Applicant: Doosan Bobcat North America, Inc., West Fargo, ND (US)

(72) Inventors: John G. Liebl, Atwater, MN (US); Kyle R. Lundeen, Cokato, MN (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 556 days.

(21) Appl. No.: 17/604,865

(22) PCT Filed: Apr. 20, 2020

(86) PCT No.: PCT/US2020/028995
§ 371 (c)(1),
(2) Date: Oct. 19, 2021

(87) PCT Pub. No.: WO2020/215079
PCT Pub. Date: Oct. 22, 2020

(65) Prior Publication Data
US 2022/0195680 A1    Jun. 23, 2022

Related U.S. Application Data

(60) Provisional application No. 62/836,392, filed on Apr. 19, 2019.

(51) Int. Cl.
*E01H 1/05* (2006.01)
*A46B 13/00* (2006.01)
*A46B 13/02* (2006.01)

(52) U.S. Cl.
CPC .......... *E01H 1/056* (2013.01); *A46B 13/001* (2013.01); *A46B 13/02* (2013.01); *A46B 2200/3073* (2013.01); *B60G 2204/4702* (2013.01)

(58) Field of Classification Search
CPC . E01H 1/056; A46B 2200/3073; A46B 13/02; A46B 13/001; B60G 2204/4702
(Continued)

(56) References Cited

U.S. PATENT DOCUMENTS

| 5,060,334 A | 10/1991 | Strauser et al. |
| 9,045,872 B2 | 6/2015 | Wahl et al. |

(Continued)

FOREIGN PATENT DOCUMENTS

| CN | 102356199 A | 2/2012 | |
| CN | 106012926 A * | 10/2016 | ............... E01H 1/05 |

(Continued)

OTHER PUBLICATIONS

First Office Action, including search report, for Chinese Patent Application No. 202080028528.3, dated Nov. 28, 2022, 13 pages.

(Continued)

*Primary Examiner* — Katina N. Henson
(74) *Attorney, Agent, or Firm* — Westman Champlin & Koehler, P.A.

(57) ABSTRACT

Disclosed embodiments include implements with a linkage and suspension configured to provide downward pressure on tool to allow it to maintain a desired level of contact with a work surface. An adjustable biasing member such as an air bag provides upward pressure on the linkage to reduce downward pressure on the work surface from the tool. Shock absorbers can also be included to hold the linkage in place and limit bouncing of the tool when it is being transported.

19 Claims, 6 Drawing Sheets

(58) Field of Classification Search
USPC .......................................................... 15/88.4
See application file for complete search history.

(56) References Cited

U.S. PATENT DOCUMENTS

| | | | |
|---|---|---|---|
| 9,648,863 B2* | 5/2017 | Henderson | A01M 21/02 |
| 9,783,942 B1* | 10/2017 | Stell | E01H 1/04 |
| 2006/0162103 A1* | 7/2006 | Kallman | E01H 1/00 |
| | | | 15/82 |
| 2008/0109982 A1* | 5/2008 | Sandberg | E01H 1/056 |
| | | | 15/256.53 |
| 2012/0124760 A1 | 5/2012 | Wahl et al. | |

FOREIGN PATENT DOCUMENTS

| | | |
|---|---|---|
| CN | 106320243 A | 1/2017 |
| CN | 108825733 A | 11/2018 |
| DE | 10 2004 052760 A1 | 5/2006 |
| DE | 10 2012 101109 A1 | 8/2013 |
| GB | 170948 A | 11/1921 |
| GB | 2 255 120 A | 10/1992 |

OTHER PUBLICATIONS

International Search Report and Written Opinion for International Application No. PCT/US2020/028995, date mailed Jul. 24, 2020, 14 pages.

* cited by examiner

SWEEPER IMPLEMENT

CROSS-REFERENCE TO RELATED APPLICATION

This Application is a Section 371 National Stage Application of International Application No. PCT/US2020/028995, filed 20 Apr. 2020, and published as WO 2020/215079 A1, on 22 Oct. 2020, in English, which claims priority to U.S. provisional application 62/836,392, filed on 19 Apr. 2019, the contents of which are hereby incorporated by reference in their entireties.

BACKGROUND

The present disclosure is related to implements and accessories for implements that are attachable to power machines. More particularly, the present disclosure is related to sweeper implements for power machines.

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Power machines such as loaders, excavators, and the like are designed to accept attachable implements, such as buckets and other types of implements, to perform work functions. In some cases, the power machine can provide signals in the form of pressurized hydraulic fluid and/or electrical signals to control functions on the implement. One type of implement that is commonly used on power machines is known as a rotary broom or sweeper. The rotary sweeper has a broom that is rotated about an axis to sweep surfaces such as concrete. Typically, a hydraulic or other motor on a side of the implement powers the rotary broom to rotate the broom about the axis. In the case of a hydraulically driven rotary sweeper, hydraulic hoses are attached to the machine to receive pressurized hydraulic fluid from the machine to power the broom.

Some rotary sweeper implements include brooms which are capable of being angled, which advantageously causes the dirt and debris being swept up to be pushed to one side. In these rotary sweeper implements, an angling actuator controls the angle of the broom. The angling actuator can also be controlled hydraulically, for example. One of the challenges with operating a broom implement of this type is that the broom ideally needs to be able to float (i.e., move up and down) over uneven terrain. In addition, when the broom is angled, it is desirable to have the broom remain centered relative to the machine.

The discussion in this Background is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter.

Disclosed embodiments include rotary sweeper or broom implements with a linkage and suspension configured to provide downward pressure on the sweeper head or broom to allow it to maintain a desired level of contact with the sweeping surface. In exemplary embodiments, the linkage of the implement couples the sweeper head or broom to a frame that is attachable to a power machine. The linkage can be a four-bar linkage with an upper and lower link each pivotally coupled to the frame and to a broom carrier that form part of the four-bar linkage. The broom carrier has a two-axis pivot joint that allows the broom to rotate about a first or vertical axis so that it can be angled under power of an angling cylinder or actuator. The broom carrier also allows rotation of the broom about a second axis, for example extending in a direction of machine travel, to allow the broom to rotate and angle side-to-side across the power machine when encountering a slanted sweeping surface. The linkage allows the broom to move up and down. A biasing member such as an air bag provides upward pressure on the linkage to reduce downward pressure on the sweeping surface from the broom. Shock absorbers can also be included between the frame and the linkage to hold the linkage in place and limit bouncing of the broom when it is being transported.

One general aspect includes an implement (100; 100'; 100"; 200; 300) configured to be coupled to a power machine (10), the implement including: a power machine interface (210; 310) having a machine mount (212; 312) configured to attach the implement to the power machine; an implement frame (222; 322); tool (224; 324) configured to perform a work task; a tool carrier (270; 370) configured to support the tool; a linkage (254; 354) coupling the tool to the implement frame through the tool carrier, the linkage configured to allow up and down movement of the tool relative to the implement frame; an adjustable biasing member configured to set a downward pressure by the tool on a work surface.

Implementations may include one or more of the following features. The implement where the implement is a sweeper implement and the tool is a broom tool, where the tool carrier (270; 370) is configured to provide pivoting of the broom tool about a vertical axis (374) to allow the broom tool to be angled under control of an angling actuator (226"; 326") such that a first end of the broom tool is forward of a second end of the broom tool to direct debris toward a side of the power machine.

The implement where the tool carrier (270; 370) is configured to provide pivoting of the broom tool about a longitudinal axis (376) extending in a direction of forward travel of the power machine to allows the broom tool to angle from side-to-side such that one of the first and second ends of the broom tool is vertically higher than other of the first and second ends of the broom tool when encountering a slanted surface.

The implement where the linkage is a four-bar linkage including: a first link (358) pivotally attached to the implement frame (222; 322) at a first pivot connection (362) and to a section (356) of the tool carrier (270; 370) at a second pivot connection (366); a second link (360) pivotally attached to the implement frame at a third pivot connection (364) and to the section of tool carrier at a fourth pivot connection (368); the implement frame; and the tool carrier. The implement where the first link is an upper link and the second link is a lower link positioned below the second link.

The implement where the adjustable biasing member includes an air bag configured to have air added or evacuated to increase or decrease pressure within the air bag to set the downward pressure by the tool on the work surface.

The implement and further including a stop (392) configured to limit travel of the tool (224; 324) by limiting movement of the linkage (254; 354). The implement where the stop is a polymeric material stop positioned at least partially within the air bag.

The implement and further including at least one shock absorber (284; 384; 386) coupled between the linkage and the implement frame and configured to limit bouncing of the tool while the implement is being transported by the power machine.

One general aspect includes a sweeper implement (100; 100';100" ; 200; 300) configured to be coupled to a power machine (10), the sweeper implement including: a power machine interface (210; 310) having a machine mount (212; 312) configured to attach the sweeper implement to the power machine; an implement frame (222; 322); a broom frame (352); a rotary actuator (226'; 326'); a broom (224; 324) supported by the broom frame and coupled to the rotary actuator, the broom configured to rotate about a first axis (328) under the control of the rotary actuator; a linkage (254; 354) coupling the broom frame to the implement frame through the broom carrier, the linkage configured to allow up and down movement of the broom frame and broom relative to the implement frame; a broom carrier (270; 370) configured to support the broom frame and broom and provide pivoting of the broom frame and broom about a vertical axis (374) and about a longitudinal axis (376); and an angling actuator (226"; 326") coupled between the broom frame and the broom carrier, the angling actuator configured to pivot the broom frame and broom about the vertical axis such that a first end of the broom is forward of a second end of the broom to direct debris toward a side of the power machine.

Implementations may include one or more of the following features. The sweeper implement where the longitudinal axis (376) extends in a direction of forward travel of the power machine, and where the broom carrier providing pivoting of the broom about the longitudinal axis allows the broom to angle from side-to-side such that the first end of the broom is vertically higher than the second end of the broom when encountering a slanted surface.

The sweeper implement and further comprising a four-bar linkage coupling the broom frame to the implement frame through the broom carrier, where the four-bar linkage includes: a first link (358) pivotally attached to the implement frame (222; 322) at a first pivot connection (362) and to a section (356) of the broom carrier (270; 370) at a second pivot connection (366); a second link (360) pivotally attached to the implement frame at a third pivot connection (364) and to the section of broom carrier at a fourth pivot connection (368); the implement frame; and the broom carrier.

The sweeper implement and further including a biasing member (278; 378) coupled to the four-bar linkage and configured to reduce downward pressure provided by the broom on a surface. The sweeper implement where the biasing member (278; 378) is configured such that reduction in the downward pressure provided by the broom on the surface is adjustable.

The sweeper implement and further including at least one shock absorber (284; 384; 386) coupled between the four-bar linkage and the implement frame and configured to limit bouncing of the broom while the sweeper implement is being transported by the power machine.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed concepts are used to provide improved rotary sweeper or broom implements. The implements include a linkage and suspension system configured to provide downward pressure on the sweeper head or broom to allow it to maintain a desired level of contact with the sweeping surface. The linkage of the implement, coupling the sweeper head or broom to a frame that is attachable to a power machine, can be a four-bar linkage. A broom carrier attaching the linkage to the broom has a two-axis pivot joint that allows the broom to rotate about a first or vertical axis so that it can be angled under power of an angling cylinder or actuator. The broom carrier also allows rotation of the broom about a second axis, for example extending in a direction of machine travel, to allow the broom to rotate and angle side-to-side across the power machine when encountering a slanted sweeping surface. A biasing member such as an air bag provides upward pressure on the linkage to reduce downward pressure on the sweeping surface from the broom. Shock absorbers between the frame and the linkage hold the linkage in place and limit bouncing of the broom when it is being transported.

Disclosed concepts can be practiced on various implements and various power machines, as will be described below. Representative implements 100, 100', 100" on which the embodiments can be practiced and representative power machines 10 and 10' to which the implement can be operably coupled are illustrated in diagram form in FIGS. 1-3 and described below before any embodiments are disclosed. For the sake of brevity, only one implement and power machine combination is discussed in detail. However, as mentioned above, the embodiments below can be practiced on any of a number of implements and these various implements can be operably coupled to a variety of different power machines. Power machines, for the purposes of this discussion, include a frame, in some instances at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
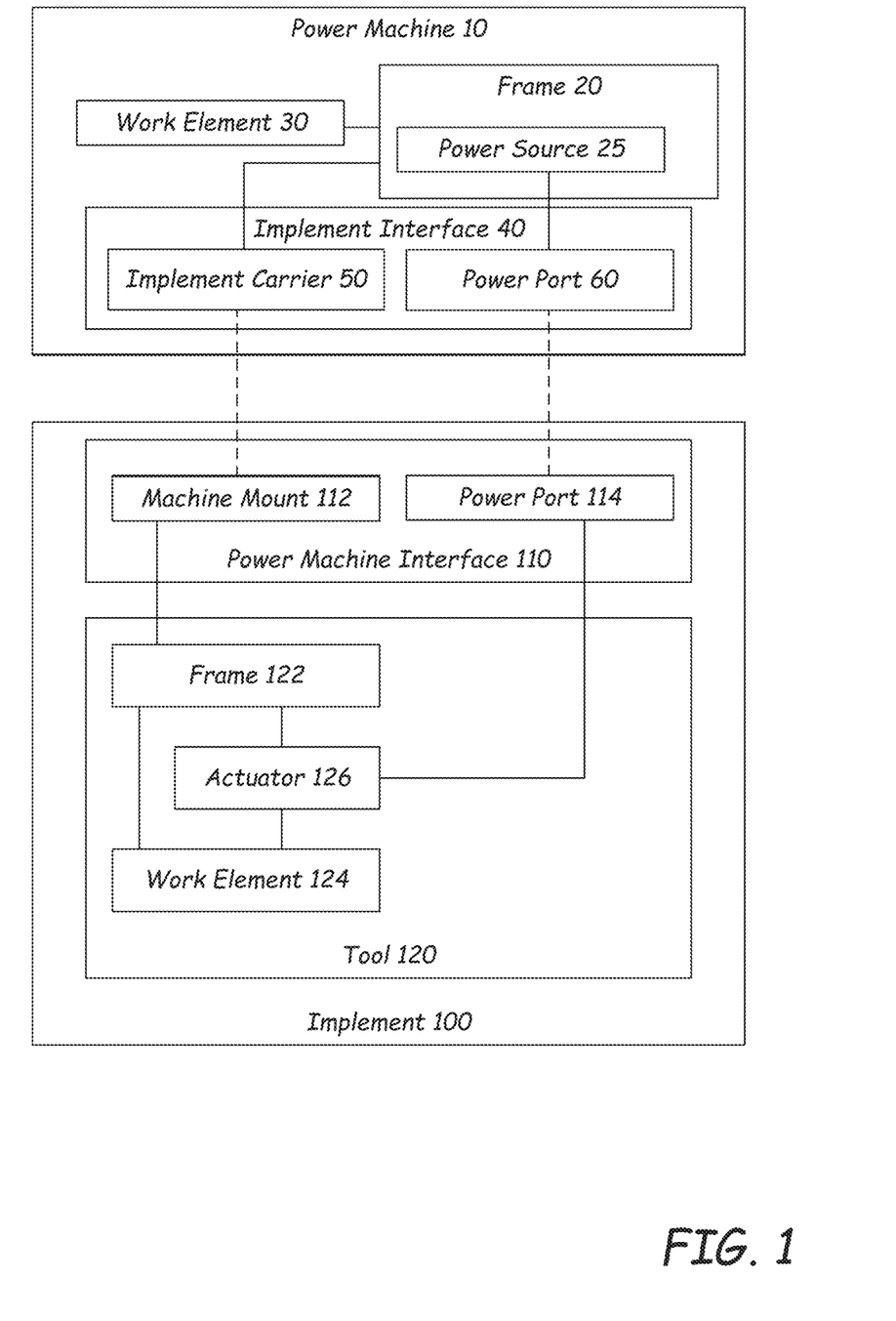
FIGS. 1-3 are each block diagrams illustrating functional systems of a representative implement on which embodiments of the present disclosure can be practiced and a power machine to which the representative implement can be coupled.

Referring now to FIG. 1, a block diagram illustrates basic systems of power machine 10 as are relevant to interact with implement 100 as well as basic features of implement 100, which represents an implement upon which the embodiments discussed below can be advantageously incorporated. At their most basic level, power machines for the purposes of this discussion include a frame 20, a power source 25, a work element 30, and, as shown in FIG. 1, an implement interface 40. On power machines such as loaders and excavators and other similar work vehicles, implement interface 40 includes an implement carrier 50 and a power port 60. The implement carrier 50 is typically rotatably attached to a lift arm or another work element and is capable of being secured to the implement. The power port 60 provides a connection for the implement 100 to provide power from the power source to the implement. Power source 25 represents one or more sources of power that are generated on power machine 10. This can include either or both of pressurized fluid and electrical power.

The implement 100, which is sometimes known as an attachment or an attachable implement, has a power machine interface 110 and a tool 120, which is coupled to the power machine interface 110. The power machine interface 110 illustratively includes a machine mount 112 and a power port 114 for coupling with power machine 10. Machine mount 112 can be any structure capable of being coupled to the implement interface 40 of power machine 10. Power port 114, in some embodiments, includes hydraulic and/or electrical couplers. Power port 114 can also include a wireless electrical connection, as may be applicable on a given implement. While both machine mount 112 and power port 114 are shown, some implements may have only one or the other as part of their power machine interface 110. Other implements, such as a bucket and some simple forklifts, would not have a power port 114 at all (e.g., See FIG. 3). Some other forklifts may have an actuator for adjusting its tines vertically, horizontally, rotationally, or by extending them in response to power signals received from the power machine 10 at power port 114.

In instances where a power machine has a specific implement carrier, the machine mount 112 will include a structure that complements the specific implement carrier. For power machines without an implement carrier, the machine mount includes features to directly mount the implement 100 to the power machine 10 such as bushings to accept pins for mounting the implement to a lift arm and an actuator for moving the implement.

For the purposes of this discussion, implements can be categorized as simple or complex. A simple implement has no actuated work element. One example of a simple implement is a bucket or a forklift without actuable tines. A complex implement has at least one actuable work element such as a forklift with actuable tines. Complex implements are further divided into those that have one actuable work element and those that have multiple work elements. Some complex implements include features of a simple implement.

In FIG. 1, the implement 100 illustrates a tool 120 for a complex implement with a single work element 124. The tool 120 includes a frame 122, which is coupled with or integral to the machine mount 112. A work element 124 is coupled to the frame 122 and is moveable in some way (vertical, horizontal, rotation, extension, etc.) with respect to the frame. An actuator 126 is mounted to the frame 122 and the work element 124 and is actuable under power to move the work element with respect to the frame. Power is provided to the actuator 126 via the power machine. Power is selectively provided in the form of pressurized hydraulic fluid (or other power source) directly from the power machine 10 to the actuator 126 via power ports 60 and 114.

Figure 2:
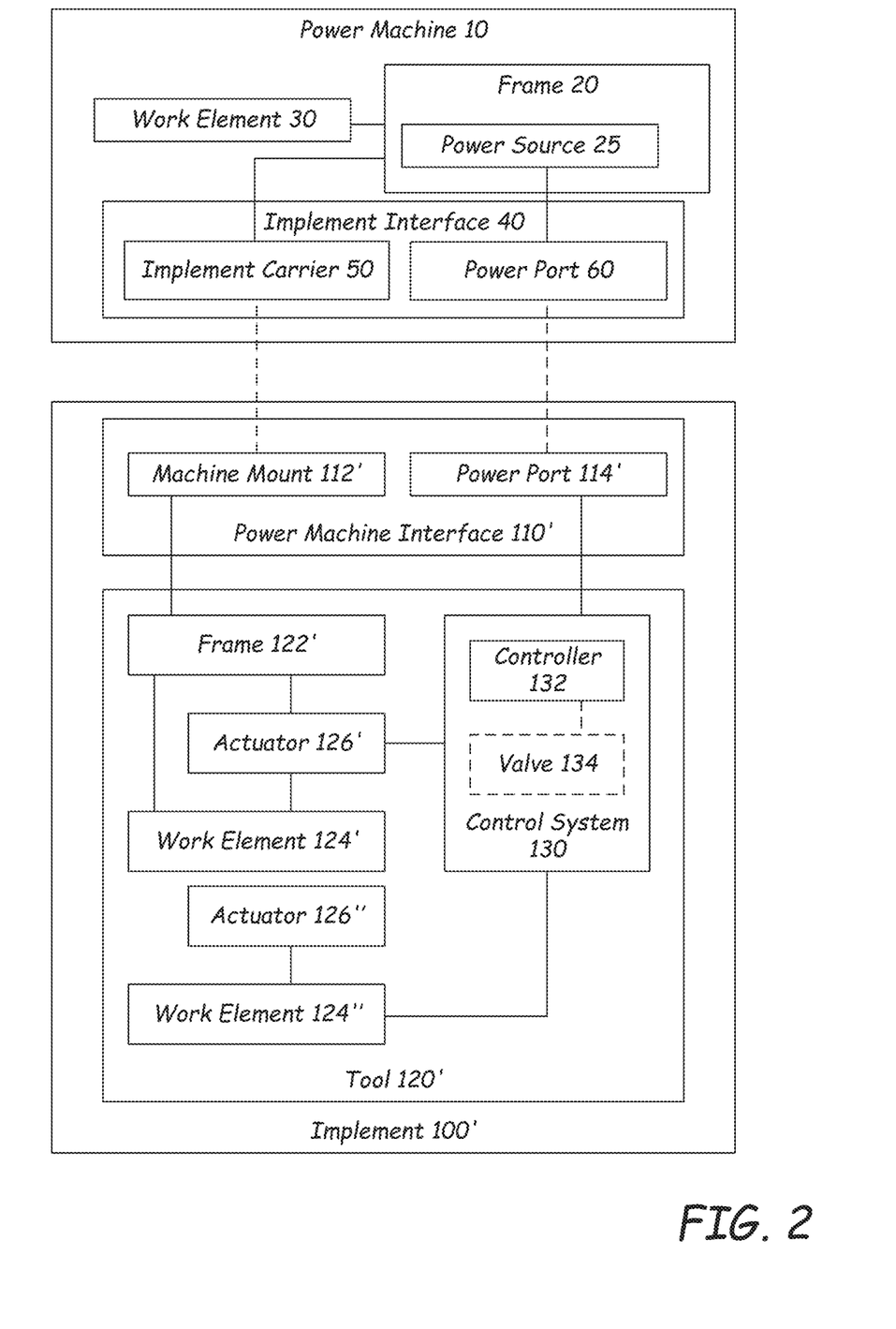

FIG. 2 illustrates an implement 100', which depicts a complex, multi-function implement. The features in FIG. 2 that are similarly numbered to those in FIG. 1 are substantially similar and are not discussed again here for the sake of brevity. Implement 100' has one or more additional work elements 124", which are shown in block form. Each work element 124" has a corresponding actuator 126" coupled thereto for controlling movement of the work element 124". A control system 130 receives power from the power machine and selectively provides power to the actuators 126' and 126" in response to signals from operator inputs. The control system 130 includes a controller 132, which is configured to receive electrical signals from the power machine 10 indicative of operator input manipulation and control power to the various actuators based on those electrical signals. The controller 132 can provide electrical signals to some or all of the actuators 126' and 126" to control their function. Alternatively, the controller 132 can control optional valve 134, which in turn controls actuation of some or all of the actuators 126' and 126" by providing pressurized hydraulic fluid to the actuators.

Although not shown in FIG. 2, in some instances, controller 132 can receive signals indicative of operator actuation of user inputs that are mounted on the implement, as opposed to the power machine. In these applications, the implement is controlled from an operator position that is located remotely from the power machine (i.e. next to the implement 100').

Figure 3:
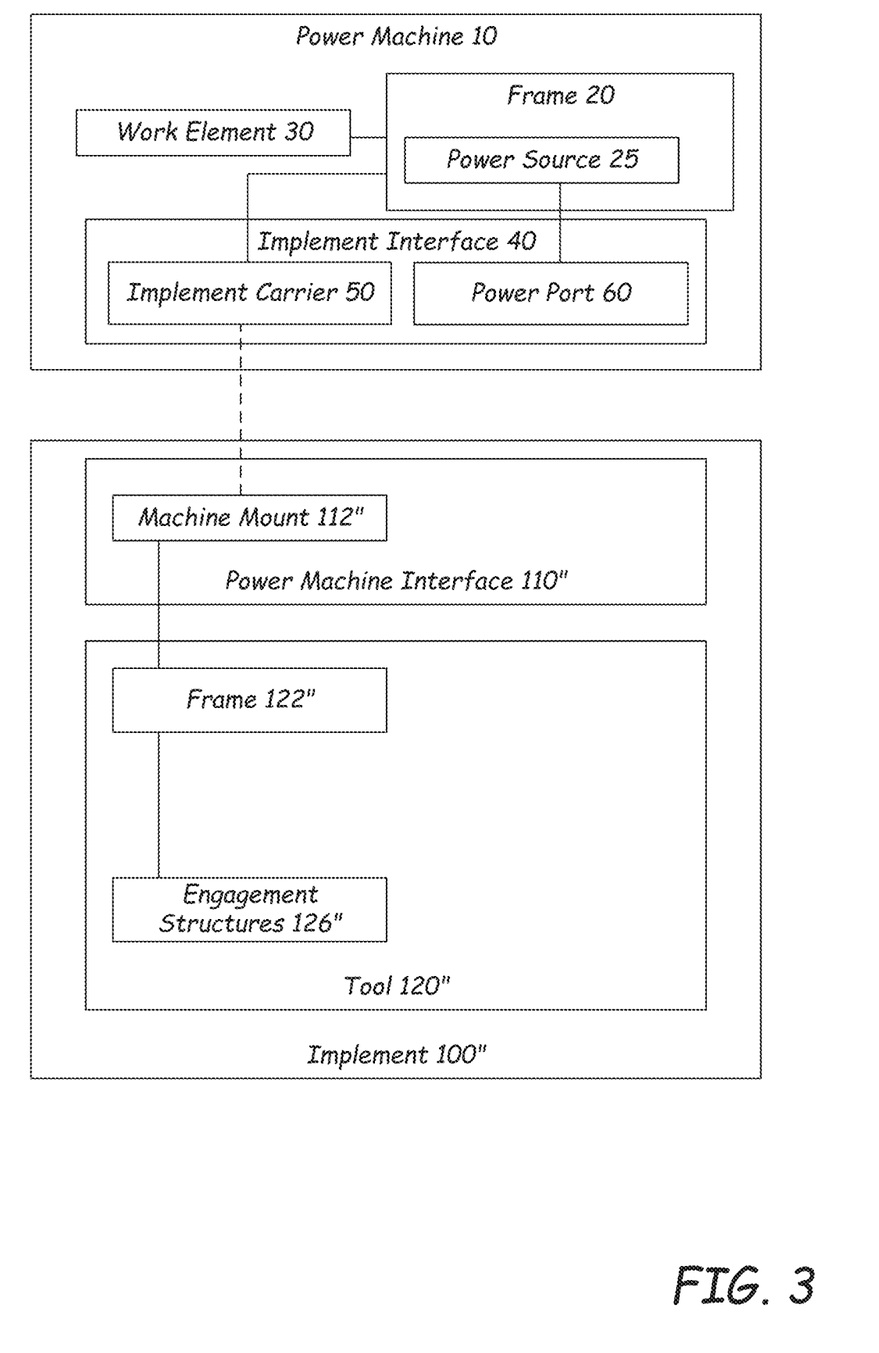

FIG. 3 illustrates an implement 100", which depicts a simple implement. The features in FIG. 3 that are similarly numbered to those in FIG. 1 are substantially similar and are not discussed again here for the sake of brevity. Implement 100" has one or more engagement structures 126" that is fixedly or moveably attached to the frame 122". Unlike a work element, which is powered by an actuator to move relative to the frame to perform a work function, the engagement structure can engage a medium to perform, in combination with the power machine, work. For example, a simple bucket has an engagement structure including a cutting edge and a defined volume that holds soil or material that is collected into a bucket. As another example, tines of a forklift can be mounted to the frame of the forklift implement for engaging a pallet. Such tines can be adjustable, but in many cases, the tines themselves are not moveable under power to perform work, but are instead engagement structures for engaging and supporting a load to be lifted and/or carried.

A power machine interface can include a machine mount in the form of a generally planar interface plate that is capable of being coupled to an implement carrier on a loader. In embodiments, various types of machine mounts can be employed. The power machine interface can also include a power port (e.g., see interfaces 110 and 110' of FIGS. 1 and 2 respectively), or not such as with the power machine interface 110" of FIG. 3. When the power machine interface includes a power port, the power port can include hydraulic conduits that are connectable to conduits on a power machine so that pressurized hydraulic fluid can be selectively provided to an actuator on the implement to actuate a connected working element. The power port can also include an electrical connection, which can be connectable to a controller (such as controller 132 of FIG. 2) and actuators on a valve (such as valve 134). The controller and valve can be included in a control system (such as control system 130) on the implement for controlling functions thereon.

Figure 4:
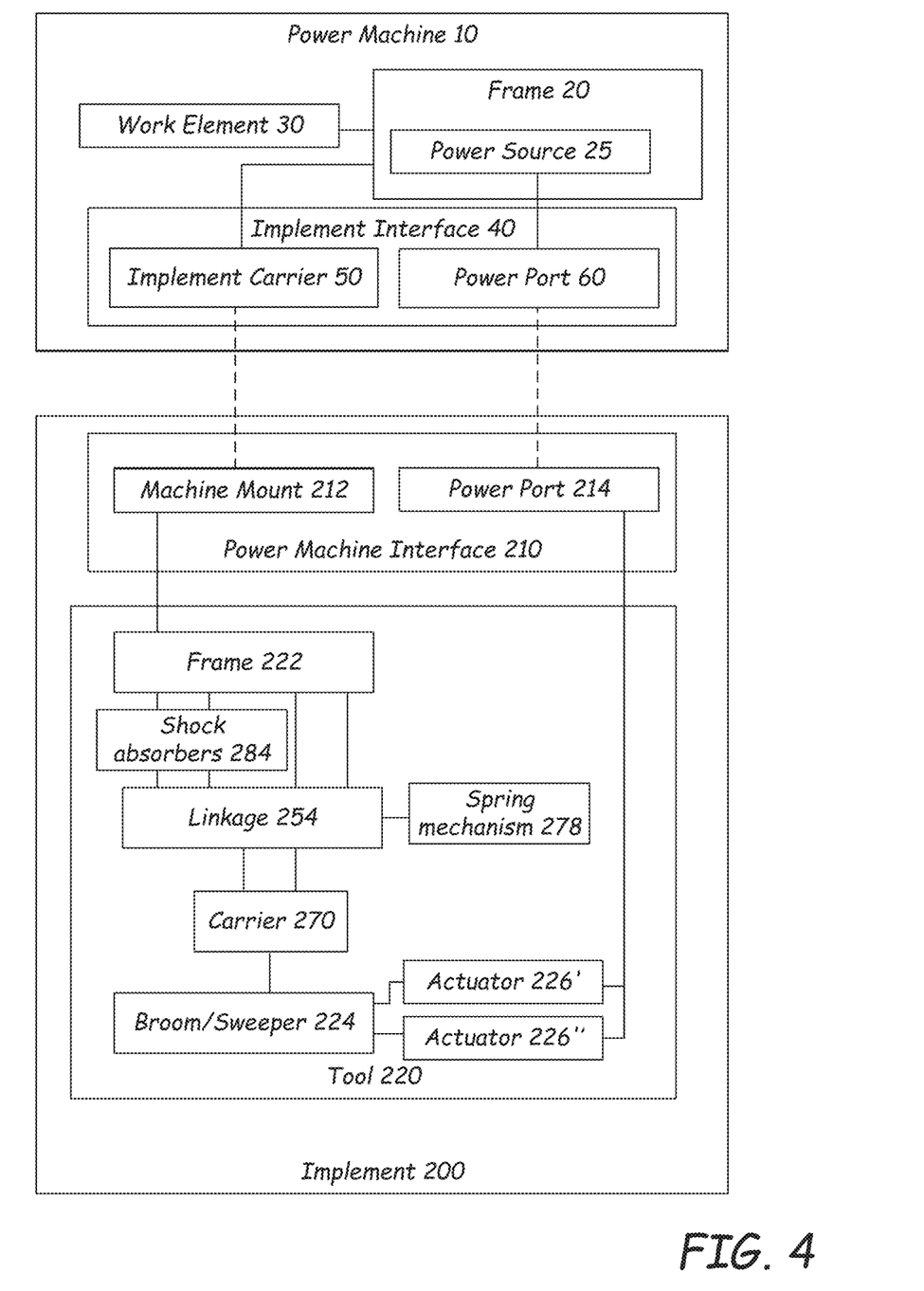
FIG. 4 is a block diagram of an implement of a type similar to those shown in FIGS. 1-3, and including a rotary broom or sweeper work element in accordance with exemplary embodiments.

Referring now to FIG. 4, shown is an implement 200, which can be in accordance with, and include features of, the implements illustrated in FIGS. 1-3. In the illustrated embodiment, implement 200 includes a power machine interface 210 and a tool 220. The tool includes a frame 222 coupled to the power machine interface 210. The power machine interface provides a machine mount 212 and one or more power ports 214 for providing power, for example in the form of pressurized hydraulic fluid, to actuators 226 of the tool 220. In some embodiments, such as discussed below with reference to FIGS. 5 and 6, the machine mount 212 can be formed as a portion of frame 222 of the tool, though that need not be the case in all embodiments.

Tool 220 includes a rotary broom/sweeper 224 powered by a rotary actuator 226', such as a hydraulic motor receiving power from power machine 10. The broom 224 is supported by a carrier 270 that is coupled to the frame 222 through a linkage 254. In exemplary embodiments, linkage 254 can be a four-bar linkage. Carrier 270 is configured to provide, in some embodiments, a two-axis pivot joint that allows the broom 224 to rotate about a vertical axis (Y-axis shown in FIG. 5) under power from an angling actuator 226" in order to direct debris toward a side of the implement 200. The broom carrier 270 also allows rotation of the broom 224 about a second axis (Z-axis shown in FIG. 5) which extends forward of the broom, for example in a direction of travel of power machine 10, to allow the broom to angle side to side when encountering a slanted surface.

In some exemplary embodiments, the four-bar linkage 254 which couples the carrier 270 to the frame 222 is formed with two links each pivotally coupled to both of the frame and the carrier. Portions of the frame and the carrier then form the remaining two links of the four-bar linkage 254. Linkage 254 allows carrier 270 and broom 224 to move up and down. A biasing member 278, for example in the form of an air bag, is provided to act against the linkage to reduce the down pressure on the surface provided by the broom. In some embodiments, the pressure provided by the biasing member to reduce the downward pressure on the broom is adjustable. For example, with an air bag biasing member, air can be added to or evacuated from the bag to increase or decrease the pressure. Also, in some exemplary embodiments, shock absorbers 284 can be coupled between the frame 222 and the linkage 254, for example to a bottom link of the linkage, to hold the linkage in place and limit bouncing of the broom when it is being transported.

Figure 5:
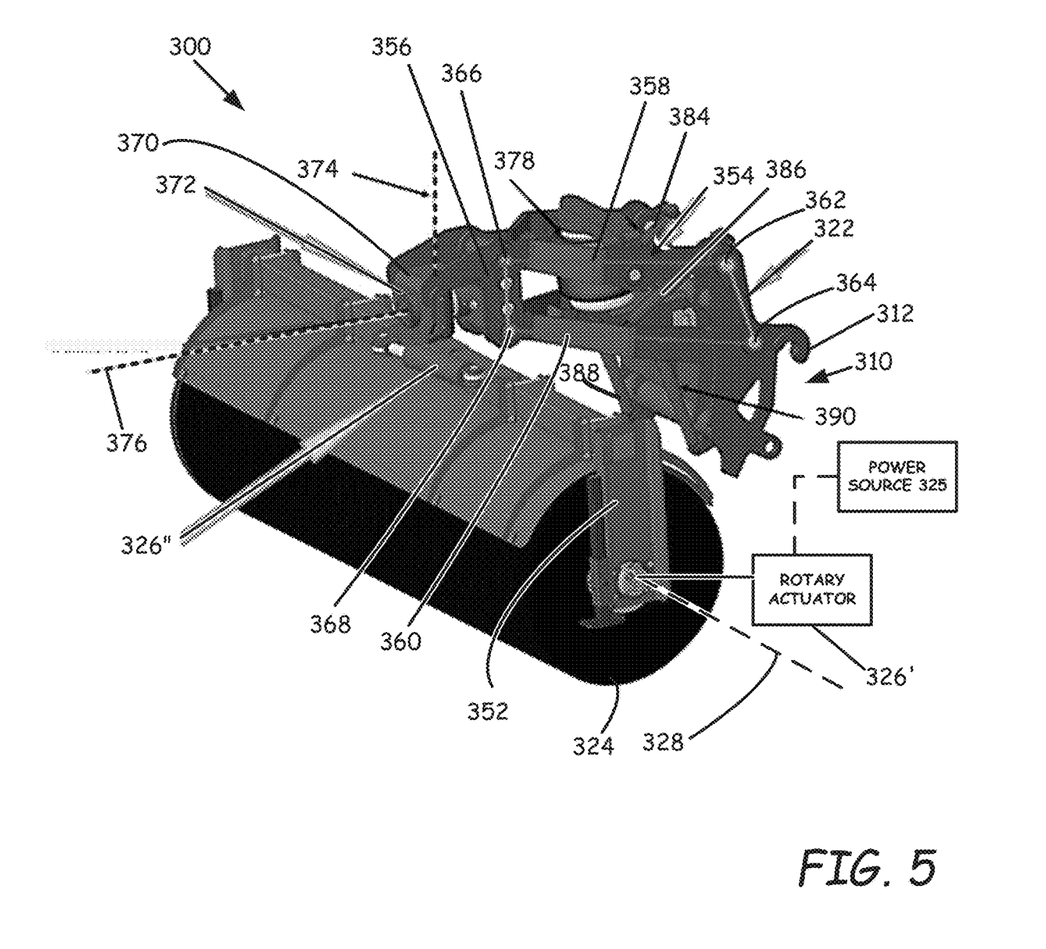
FIGS. 5 and 6 are perspective and cross-sectional side views, respectively, of an implement as shown in FIG. 4 in accordance with one exemplary embodiment.
Figure 6:
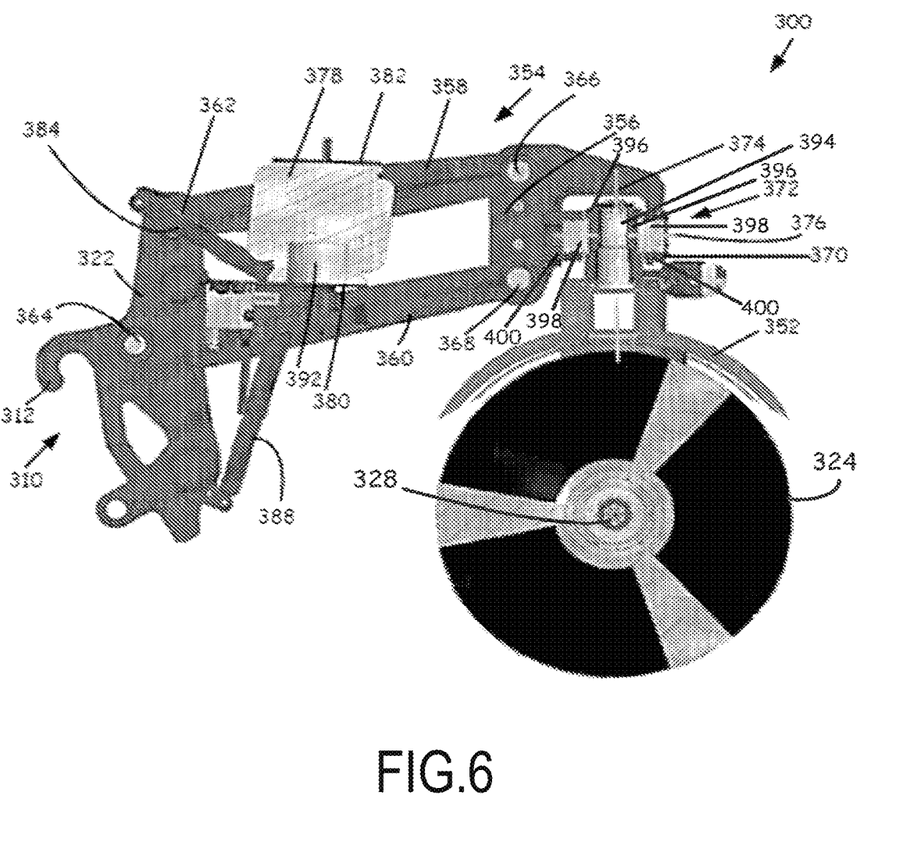

Referring now to FIGS. 5 and 6, shown is a rotary broom or sweeper implement 300, which is one more particular embodiment of implement 200 discussed above with reference to FIG. 4. Like implement 200, implement 300 includes a rotary broom which is supported by a linkage configured to provide a suitable amount of downward pressure on the sweeper head to allow it to maintain a desired level of contact with the sweeping surface.

As shown in FIGS. 5 and 6, implement 300 includes a frame 322 that is attachable to a power machine by a machine mount 312 of a power machine interface 310. A linkage 354 couples the broom 324 to the implement frame 322 through a broom frame 352 and a broom carrier 370. The broom 324 is rotatably mounted to the broom frame and configured to rotate about an axis 328 under the power of a rotary actuator 326', such as a hydraulic motor, which receives hydraulic power from a power source 325 on the power machine. The broom frame 352 is in turn mounted to the broom carrier 370.

Linkage 354 is, in some embodiments, a four-bar linkage with two links 358 and 360 each pivotally attached to the frame 322 and to the broom carrier 370. As shown, upper link 358 is pivotally attached to frame 322 at pivot connection 362 and to a section 356 of broom carrier 370 at pivot connection 366. Lower link 360 is pivotally attached to frame 322 at pivot connection 364 and to section 356 of broom carrier 370 at pivot connection 368. Frame 322 and section 356 of broom carrier 370 form the other two linkages of the four-bar linkage.

The broom carrier 370 includes a 2-axis pivot joint 372 that allows the broom 324 and broom frame 352 to rotate about a first axis, for example a vertical or Y-axis 374, to angle under power from an angling actuator or cylinder 326" connected between the broom carrier 370 and the broom frame 352. As can be seen in FIG. 6, a vertically oriented pin 394 positioned to rotate within a first bushing 396 is configured to provide rotation about the vertical axis 374. Bushing 396 itself rotates about a second axis 376, which can be a generally horizontally extending axis. Rotation of bushing 396 about the second axis 376 is achieved with pins 398, for example horizontally extending pins, which are positioned to rotate within one or more bushings 400 coupled to the carrier 370. Like the rotary actuator 326', the angling actuator 326" is powered by a power source 325 on the power machine. This angling about the axis 374 moves one end of broom 324 forward of the power machine as compared to the other end of the broom to direct debris toward one side of the machine. As discussed, the broom carrier 370 can also rotate about a second axis, for example a longitudinally extending or Z-axis 376 orthogonal to the vertical axis 374. This second axis 376 can extend generally in the direction of forward power machine travel, and allows the broom frame 352 and broom 324 to angle side-to-side (e.g., such that one end of the broom is higher than the other end of the broom) when encountering a slanted surface. Linkage 354 allows the broom to move up and down with surface variations.

A biasing member 378, in the form of an air bag, is provided to act against the linkage 354 to reduce the downward pressure provided by the broom on the surface being swept. As can be seen in the cross-section view of FIG. 6, the air bag 378 is attached to the frame via a plate 380 on the bottom of the air bag. A top plate 382 or other structure couples the airbag to the top link 358 such that the air bag acts against the top link to urge the broom 324 upward. In exemplary embodiments, the air bag 378 can be inflated to different pressures, allowing the biasing force acting against the top link 358 to be adjustable, thus allowing the downward pressure of the broom or other tool on the work surface to be set to different levels for different purposes. For instance, to remove mud or other adhered materials from a work surface, the air bag 378 inflation can be controlled to allow more downward pressure by the tool on the work surface. However, in other uses, such as sweeping sand from a grassy surface, inflation of the air bag can be controlled to reduce the downward pressure by the tool on the work surface.

In some exemplary embodiments, a stop 392 is included to limit travel of the tool 324 by limiting movement of the linkage 354. In exemplary embodiments, stop can be a polymeric material positioned partially or entirely within air bag 378, for example on plate 380. In other embodiments, stop 392 can be positioned exterior to the air bag. Downward movement of the tool by linkage 354 is limited by an opposing surface, such as plate 382 or a portion of a link (e.g., link 358) coming into contact with the stop.

Also shown in FIGS. 5 and 6 are automotive style shock absorbers coupled between the frame 322 and the bottom link 360. As shown, shock absorbers 384 and 386 are coupled to the bottom link 360 and to a portion of the frame 322 at a position above the bottom link. Shock absorbers 388 and 390 are coupled to the bottom link 360 and to a portion of the frame 322 at a position below the bottom link. These shock absorbers apply forces which work to hold the linkage 354 in place, limiting bouncing of the broom when implement 300 is being transported while mounted on a power machine.

Although the present invention has been described with reference to preferred embodiments, workers skilled in the art will recognize that changes may be made in form and detail without departing from the spirit and scope of the invention. For example, while described in terms of a sweeper implement and a broom tool, disclosed embodiments can be used with other types of implements, for example having a tool carrier and a tool similar with characteristics similar to those discussed.

What is claimed is:

1. An implement configured to be coupled to a power machine, the implement comprising:
   a power machine interface having a machine mount configured to attach the implement to the power machine;
   an implement frame;
   a tool configured to perform a work task;
   a tool carrier configured to support the tool;
   a linkage coupling the tool to the implement frame through the tool carrier, the linkage configured to allow up and down movement of the tool relative to the implement frame; and
   an air bag positioned between the implement frame and the linkage, wherein a top of the air bag is coupled to the linkage and a bottom of the air bag is coupled to the implement frame and wherein the air bag is configured to be inflated and deflated to different pressures to provide a biasing force acting against the linkage to thereby set a downward pressure by the tool on a work surface.

2. The implement of claim 1, wherein the implement is a sweeper implement and the tool is a broom tool, wherein the tool carrier is configured to provide pivoting of the broom tool about a vertical axis to allow the broom tool to be angled under control of an angling actuator such that a first end of the broom tool is forward of a second end of the broom tool to direct debris toward a side of the power machine.

3. The implement of claim 2, wherein the tool carrier is configured to provide pivoting of the broom tool about a longitudinal axis extending in a direction of forward travel of the power machine to allows the broom tool to angle from side-to-side such that one of the first and second ends of the broom tool is vertically higher than other of the first and second ends of the broom tool when encountering a slanted surface.

4. The implement of claim 1, wherein the linkage is a four-bar linkage including:
   a first link pivotally attached to the implement frame at a first pivot connection and to a section of the tool carrier at a second pivot connection;
   a second link pivotally attached to the implement frame at a third pivot connection and to the section of tool carrier at a fourth pivot connection;
   the implement frame; and
   the tool carrier.

5. The implement of claim 4, wherein the first link is an upper link and the second link is a lower link positioned below the first link.

6. The implement of claim 1, and further comprising a stop configured to limit travel of the tool by limiting movement of the linkage.

7. The implement of claim 6, wherein the stop is positioned at least partially within the air bag.

8. The implement of claim 1, and further comprising at least one shock absorber coupled between the linkage and the implement frame and configured to limit bouncing of the tool while the implement is being transported by the power machine.

9. A sweeper implement configured to be coupled to a power machine, the sweeper implement comprising:
   a power machine interface having a machine mount configured to attach the sweeper implement to the power machine;
   an implement frame;
   a broom frame;
   a rotary actuator;
   a broom supported by the broom frame and coupled to the rotary actuator, the broom configured to rotate about a first axis under the control of the rotary actuator;
   a linkage coupling the broom frame to the implement frame, the linkage configured to allow up and down movement of the broom frame and broom relative to the implement frame;
   a broom carrier operably coupled to the linkage and configured to support the broom frame and broom and provide pivoting of the broom frame and broom about a vertical axis and about a longitudinal axis that intersects the vertical axis, the broom carrier having a vertical pin carried in a first bushing to provide rotation of the broom carrier about the vertical axis and a horizontally positioned pin extending from the first bushing along the longitudinal axis that is engaged to rotate within a horizontal bushing to provide rotation of the first bushing about the longitudinal axis; and
   an angling actuator coupled between the broom frame and the broom carrier, the angling actuator configured to pivot the broom frame and broom about the vertical axis such that a first end of the broom is forward of a second end of the broom to direct debris toward a side of the power machine.

10. The sweeper implement of claim 9, wherein the longitudinal axis extends in a direction of forward travel of the power machine, and wherein the broom carrier providing pivoting of the broom about the longitudinal axis allows the broom to angle from side-to-side such that the first end of the broom is vertically higher than the second end of the broom when encountering a slanted surface.

11. The sweeper implement of claim 9, and further comprising a four-bar linkage coupling the broom frame to the implement frame through the broom carrier, the four-bar linkage including:
   a first link pivotally attached to the implement frame at a first pivot connection and to a section of the broom carrier at a second pivot connection;
   a second link pivotally attached to the implement frame at a third pivot connection and to the section of broom carrier at a fourth pivot connection;
   the implement frame; and
   the broom carrier.

12. The sweeper implement of claim 11, and further comprising a biasing member coupled to the four-bar linkage and configured to reduce downward pressure provided by the broom on a surface.

13. The sweeper implement of claim 12, wherein the biasing member is configured such that reduction in the downward pressure provided by the broom on the surface is adjustable.

14. The sweeper implement of claim 9, and further comprising at least one shock absorber coupled between the four-bar linkage and the implement frame and configured to limit bouncing of the broom while the sweeper implement is being transported by the power machine.

15. An implement configured to be coupled to a power machine, the implement comprising:
- a power machine interface having a machine mount configured to attach the implement to the power machine;
- an implement frame;
- a tool configured to perform a work task;
- a tool carrier configured to support the tool;
- a linkage coupling the tool to the implement frame through the tool carrier and having a first link and a second link located below the first link, the linkage configured to allow up and down movement of the tool relative to the implement frame; and
- an air bag positioned between the implement frame and the linkage with a top of the air bag being coupled to the first link and a bottom of the air bag being coupled to the implement frame, wherein the air bag is configured to be inflated and deflated to different pressures to provide a biasing force acting against the linkage to thereby set a downward pressure by the tool on a work surface.

16. An implement of claim 15, wherein the tool carrier is configured to provide pivoting of the tool about a vertical axis and about a longitudinal axis oriented in a direction of forward power machine travel, wherein the tool carrier includes a vertical pin carried in a first bushing that is oriented along the vertical axis.

17. The implement of claim 16, further comprising an angling actuator coupled between the tool and the tool carrier, the angling actuator configured to pivot the tool about the vertical axis using the vertical pin such that a first end of the tool is forward of a second end of the tool and wherein the tool carrier further includes a longitudinal pin that extends from the first bushing along the longitudinal axis and is engaged to rotate within a longitudinal bushing that is operably coupled to the linkage to allow the first and second ends of the tool to move up and down such that the first end of the tool is vertically higher than the second end of the tool when encountering ground variations.

18. The implement of claim 15, further comprising a stop configured to limit travel of the tool by limiting movement of the linkage, wherein the stop is positioned at least partially within the air bag.

19. The implement of claim 15, wherein the implement is a sweeper implement and the tool is a broom tool.

* * * * *